(12) United States Patent
Marukawa et al.

(10) Patent No.: US 7,060,116 B2
(45) Date of Patent: Jun. 13, 2006

(54) METHOD OF BINDING A PLURALITY OF SEALED BATTERY CELLS

(75) Inventors: Shuhei Marukawa, Toyohashi (JP); Ko Watanabe, Toyohashi (JP); Toyohiko Eto, Toyota (JP); Masayoshi Iwase, Toyota (JP); Tomokazu Yamauchi, Toyota (JP); Takahiko Miki, Toyota (JP)

(73) Assignees: Matsushita Electric Industrial Co., Ltd., Osaka (JP); Toyota Jidoshi Kabushiki Kaisha, Toyota (JP)

( * ) Notice: Subject to any disclaimer, the term of this patent is extended or adjusted under 35 U.S.C. 154(b) by 0 days.

(21) Appl. No.: 11/104,019

(22) Filed: Apr. 12, 2005

(65) Prior Publication Data
US 2005/0186470 A1 Aug. 25, 2005

Related U.S. Application Data

(62) Division of application No. 09/843,637, filed on Apr. 26, 2001, now abandoned.

(30) Foreign Application Priority Data
Apr. 28, 2000 (JP) ............................. 2000-131758

(51) Int. Cl.
*H01M 2/02* (2006.01)
*H01M 2/10* (2006.01)

(52) U.S. Cl. ..................................... 29/623.1; 429/159
(58) Field of Classification Search ........ 429/149–152, 429/123, 99, 159; 29/623.1
See application file for complete search history.

(56) References Cited

U.S. PATENT DOCUMENTS

| 1,588,803 A | 6/1926 | Owen |
| 3,320,095 A | 5/1967 | Bingeman et al. |
| 3,769,095 A | 10/1973 | Schmidt |
| 5,510,203 A | 4/1996 | Hamada et al. |
| 5,817,435 A | 10/1998 | Shimakawa et al. |

FOREIGN PATENT DOCUMENTS

JP 2000-48867 2/2000

*Primary Examiner*—Gregg Cantelmo
(74) *Attorney, Agent, or Firm*—Hamre, Schumann, Mueller & Larson, P.C.

(57) ABSTRACT

The combined battery of the present invention includes two end plates and a plurality of general cells stacked adjacent each other and bound by two end plates. The general cells are provided with a battery container made of resin, and bound by two end plates with a binding force equal to or lower than a threshold value determined based on the number and the compressibility of the cells and the stiffness of the battery container, in such a manner that no more than a predetermined amount of irreversible deformation will be caused in the battery container.

2 Claims, 9 Drawing Sheets

METHOD OF BINDING A PLURALITY OF SEALED BATTERY CELLS

This is a request for filing a DIVISIONAL application under 37 CFR§ 1.53(b) of Ser. No. 09/843,637, filed on Apr. 26, 2001 entitled COMBINED BATTERY, which has been abandoned.

BACKGROUND OF THE INVENTION

1. Field of the Invention

The present invention relates to a combined battery including a plurality of cells.

2. Description of the Related Art

In recent years, secondary cells have come into wide use even in equipment requiring a high capacity and a high voltage. Such equipment uses a combined battery in which a number of secondary cells are connected in series or in parallel. Examples of the combined battery include those of the monoblock type, which accommodate a plurality of electrode plate groups in one battery container, and those of binding type in which a plurality of cells (secondary cells) are bound by using end plates or binding bands. If there are about 10 electrode plate groups, the monoblock type is effective because of its satisfactory volumetric efficiency. However, in the case of constructing a combined battery by using 10 or more electrode plate groups, cooling efficiency will decrease.

On the other hand, according to the binding type, by forming convex portions such as ribs on a battery container or placing a spacer between battery containers, cooling efficiency can be enhanced. Furthermore, even in the case where one of the cells has a defect, only the defective cell needs to be exchanged. Thus, the binding type is excellent in working efficiency.

However, in the combined battery of the conventional binding type, when the battery container of one cell expands, the surrounding normal cells receive a load generated by the expansion, which may deform the battery container irreversibly. In particular, when convex portions are not formed on side surfaces of the battery container on which an electrode plate group is disposed, the battery container is likely to expand due to the expansion of the electrode plate group, and the battery container may be deformed irreversibly.

SUMMARY OF THE INVENTION

Therefore, with the foregoing in mind, it is an object of the present invention to provide a combined battery capable of suppressing irreversible deformation of a battery container to no more than a predetermined amount.

In order to achieve the above-mentioned object, the combined battery of the present invention includes two end plates and a plurality of cells stacked adjacent each other and bound by the two end plates, wherein the cells are provided with a battery container made of resin, and the plurality of cells are bound by the two end plates with a binding force equal to or lower than a threshold value determined based on a number and a compressibility of the cells and stiffness of the battery container, in such a manner that no more than a predetermined amount of irreversible deformation will be caused in the battery container. Because of the above-mentioned structure, a combined battery is obtained that can suppress irreversible deformation in the battery container to no more than a predetermined amount. In the present specification, the term "cell" includes a "unit cell".

In the above-mentioned combined battery, it is preferable that the cell includes an electrode plate group containing positive electrode plates and negative electrode plates stacked adjacent each other with separators interposed therebetween, and the cells are stacked in the direction of the stacking direction of the electrode plate group.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative embodiment with reference to the drawings.

Figure 1:
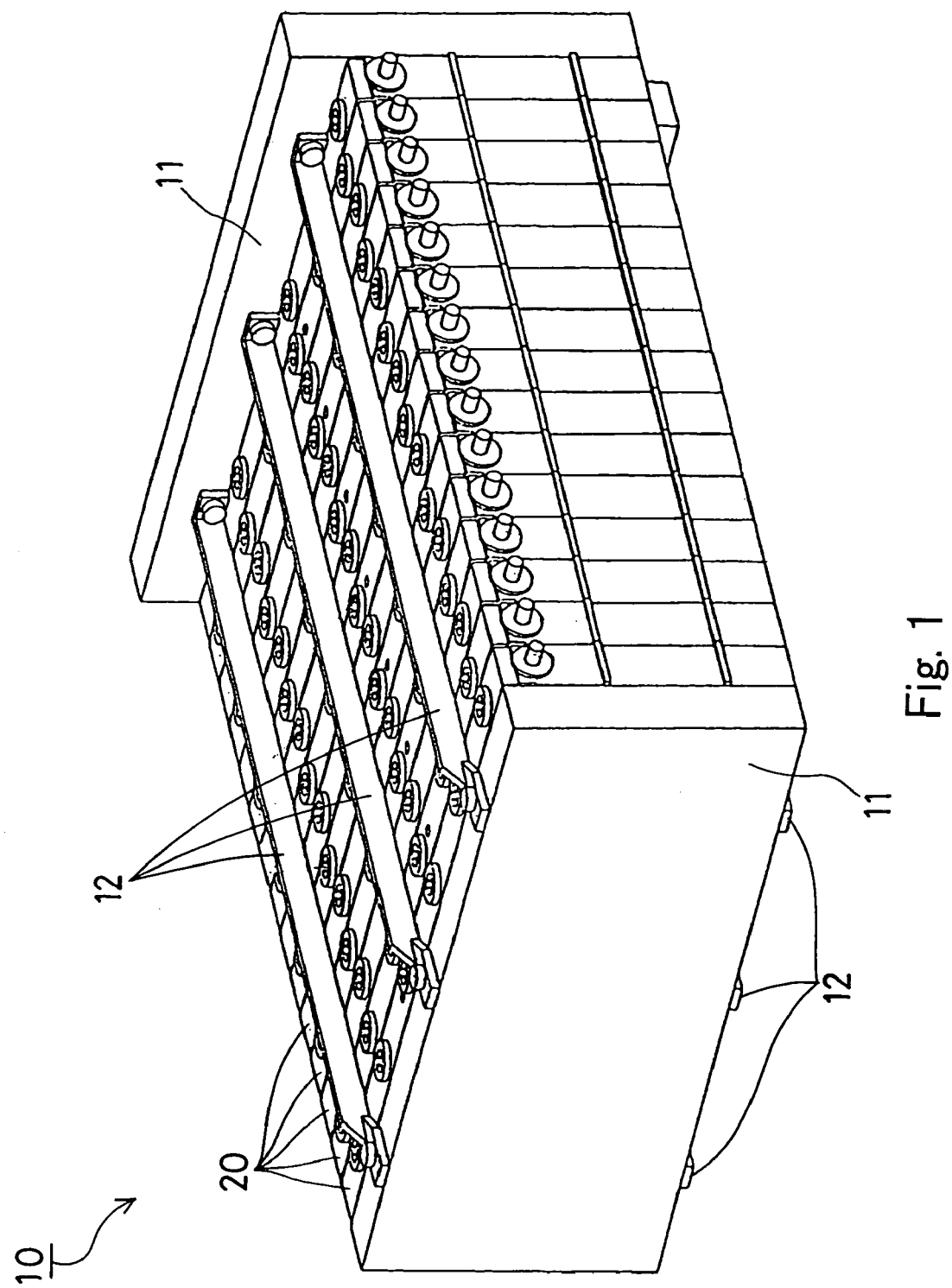
FIG. 1 is a perspective view showing an exemplary combined battery of the present invention.

FIG. 1 shows an exemplary combined battery 10 of the present invention. Referring to FIG. 1, the combined battery 10 includes a plurality of stacked unit cells 20, two end plates 11 disposed at both ends of the stacked unit cells 20 in a stacking direction, and binding bands 12 disposed so as to connect two end plates 11.

The end plate 11 is made of, for example, a metal plate such as stainless steel and nickel-plated iron. The binding band 12 is made of a plate or a bar of the same material as that of the end plate 11.

Figure 2:
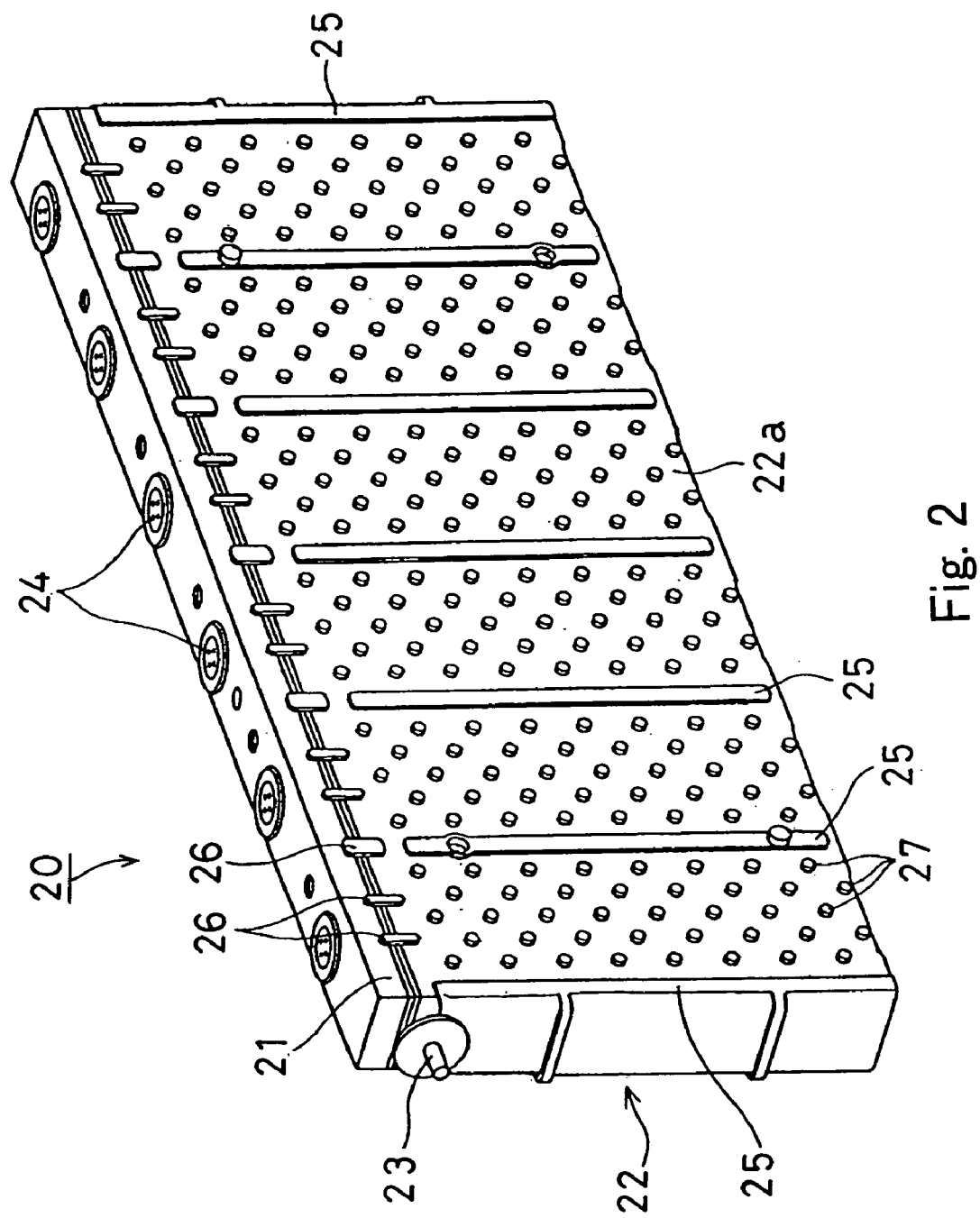
FIG. 2 is a perspective view showing an exemplary unit cell used in the combined battery of the present invention.

FIG. 2 shows a perspective view of the unit cell 20. Referring to FIG. 2, the unit cell 20 includes an integrated battery container 22 covered with a lid 21, an electrode terminal 23 disposed on the integrated battery container 22, and safety valves 24 disposed on the lid 21.

The lid 21 and the integrated battery container 22 are made of resin such as polypropylene (PP), polyphenylene ether (PPE), or ABS.

The integrated battery container 22 has a plurality of ribs 25 placed at a predetermined interval on each side surface 22a with the largest area among those of the battery container 22. The ribs 25 are formed at positions corresponding to partition walls 31 of the unit cell shown in FIG. 3, and each rib 25 has substantially the same height from the side surface 22a. The lid 21 and the integrated battery container 22 have a plurality of convex portions 26 at a border between the lid 21 and the integrated battery container 22 on the side surface 22a. The integrated battery container 22 includes a plurality of convex portions 27 on the side surface 22a. The ribs 25, and the convex portions 26 and 27 come into contact with an adjacent unit cell 20 in the combined battery 10. The ribs 25, and the convex portions 26 and 27 (in particular, ribs 25) function to transmit a load given by the end plates 11 to the adjacent unit cell 20. Furthermore, the ribs 25, and the convex portions 26 and 27 function to easily cool the unit cell 20 by forming a space between the adjacent unit cells 20.

Figure 3:
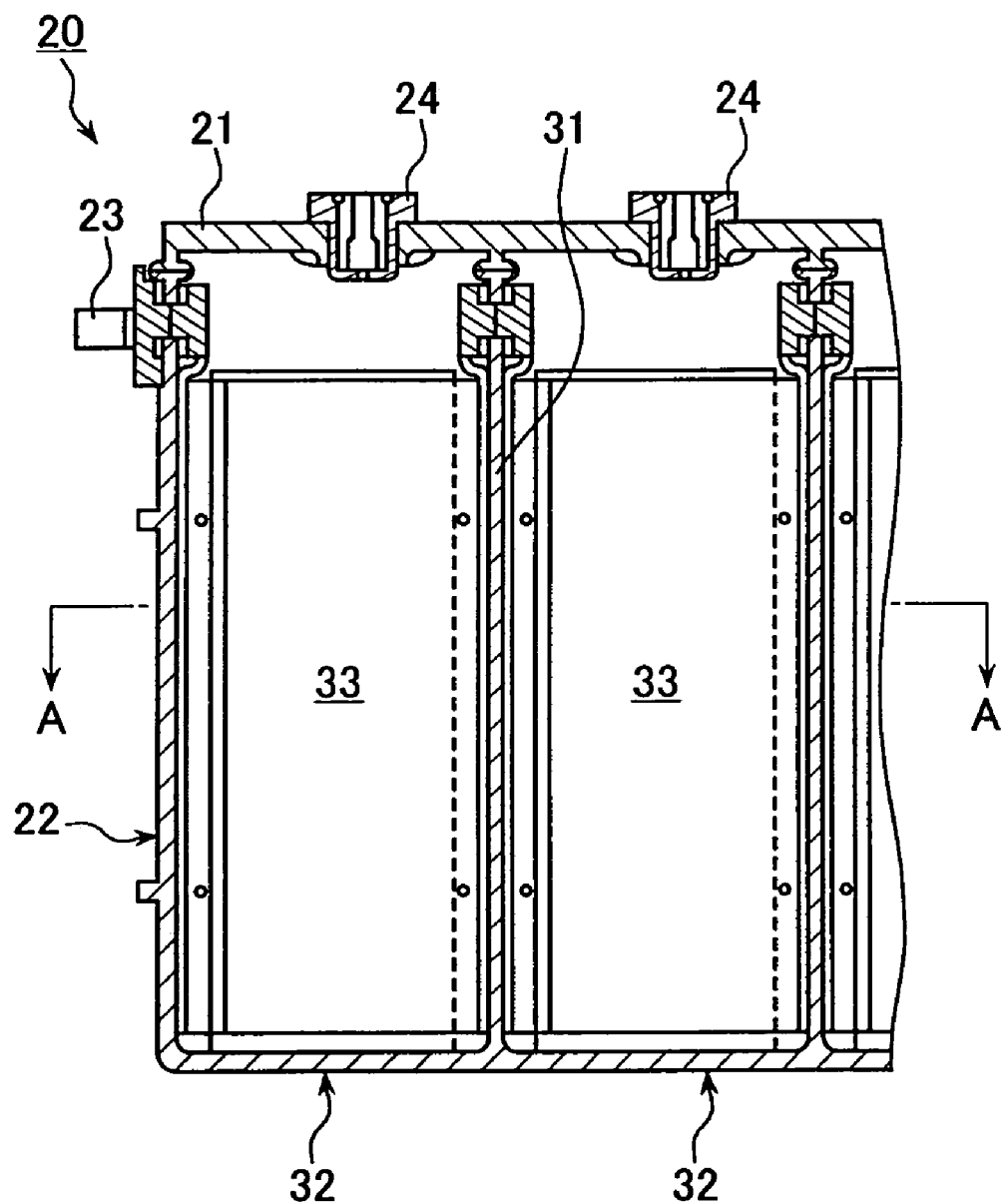
FIG. 3 is a partial cross-sectional view of the unit cell in FIG. 2.

FIG. 3 shows a cross-sectional view of the combined battery 10 in a direction parallel to the side surface 22a of the integrated battery container 22. The unit cell 20 includes a plurality of battery containers 32 partitioned by a plurality of partition walls 31 in the integrated battery container 22. The ribs 25 are formed at positions corresponding to the partition walls 31. In each battery container 32, an electrode plate group 33 and an electrolyte (not shown) are disposed, and each battery container 32 constitutes a cell. The partition walls 31 extend from the bottom surface of the integrated battery container 22 to the vicinity of the lid 21.

Figure 4:
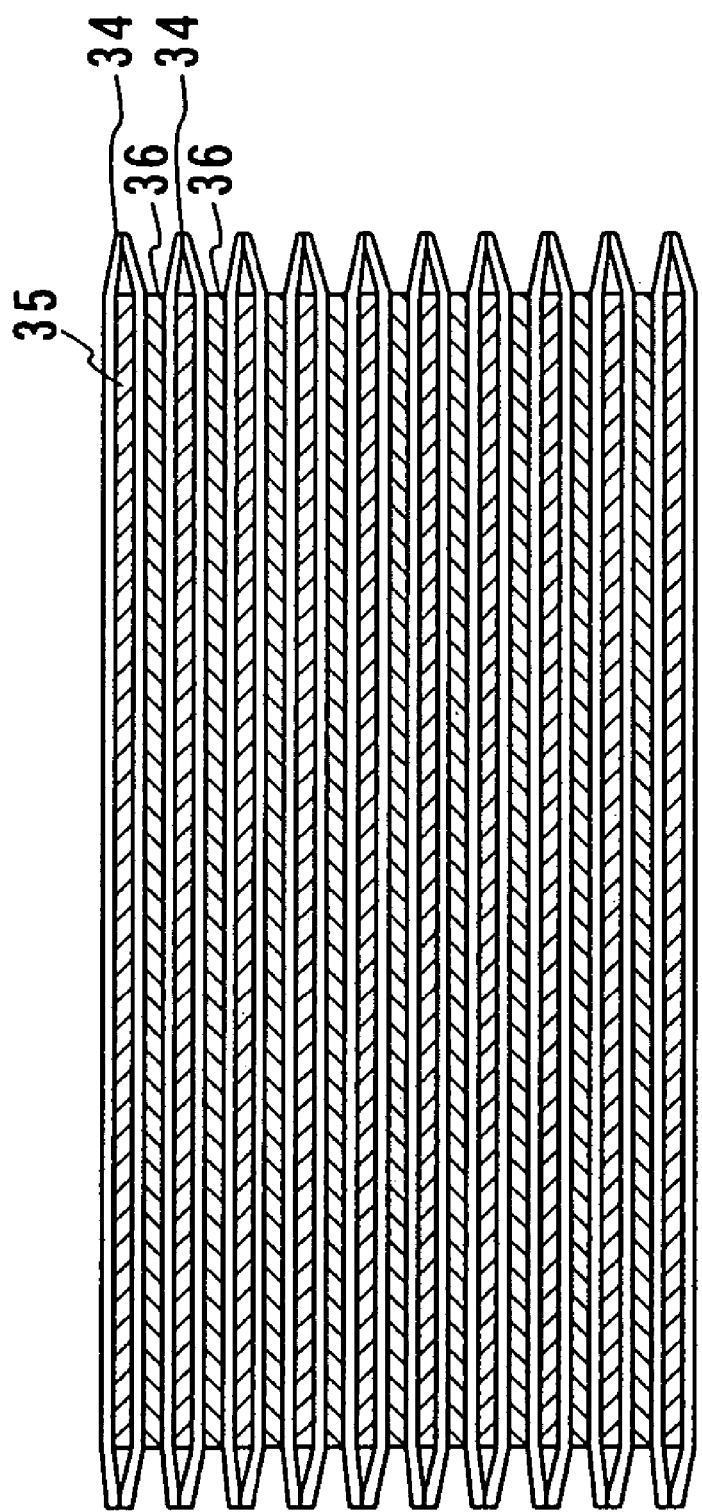
FIG. 4 is a partial cross-sectional view of the unit cell in FIG. 2.

FIG. 4 shows a cross-sectional view of the electrode plate group 33 taken along line A—A in FIG. 3. Referring to FIG. 4, the electrode plate group 33 includes a plurality of positive electrode plates 35 and a plurality of negative electrode plates 36 stacked adjacent each other with separators 34 interposed therebetween. As shown in FIG. 4, the positive electrode plates 35 and the negative electrode plates 36 are disposed in a direction parallel to the side surface 22a. More specifically, in the electrode plate group 33, the positive electrode plates 35 and the negative electrode plates 36 are stacked adjacent each other in a direction vertical to the side surface 22a. As the positive electrode plates 35 and the negative electrode plates 36, those which are used for a general secondary cell can be used, respectively. For example, a positive electrode plate containing nickel and a negative electrode plate containing a hydrogen-storing alloy can be used.

As described above, in the combined battery 10, a plurality of unit cells 20 are stacked adjacent each other so that the adjacent unit cells 20 are opposed at the side surface 22a, and bound and fixed by the end plates 11 and the binding bands 12. The end plates 11 are disposed at both ends of the stacked unit cells 20, and bound by the binding bands 12. The unit cells 20 are stacked in a direction corresponding to a direction in which the positive electrode plates 35 and the negative electrode plates 36 are stacked.

The internal pressure of a cell is increased due to overcharge and overdischarge. In the case where the internal pressure of a plurality of cells is increased simultaneously, loads thereof cancel each other, whereby the cells maintain an initial binding size. However, in the case where the internal pressure of only several cells among a plurality of cells is increased, only the cells with their internal pressure increased expand, and compress other cells whose internal pressure is not increased. As a result, the expanded cells further expand. Furthermore, the integrated battery container 22 has an expansion limit. When expansion exceeding the limit occurs, irreversible deformation is caused in the integrated battery container 22. As factors influencing the expansion of the integrated battery container 22, the number of unit cells 20 to be bound, the compressibility of the unit cells 20, the stiffness of the integrated battery container 22, and the internal pressure of a cell can be considered. The internal pressure of a cell mainly is determined in terms of the performance of a cell. Therefore, it is difficult to handle the internal pressure of a cell as a factor for controlling the expansion of a cell. Thus, the remaining three factors are required to be controlled so that the expansion of a cell becomes equal to or lower than the limit. Hereinafter, the influence of varying the number of unit cells 20 to be bound, the compressibility of the unit cells 20, and the stiffness of the integrated battery container 22 will be described in this order.

Figure 5A:
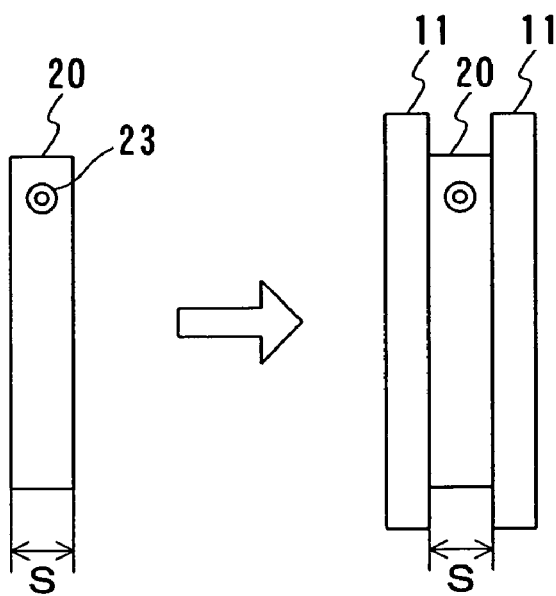
FIGS. 5A and 5B illustrate the relationship between the load and the cell width.
Figure 5B:
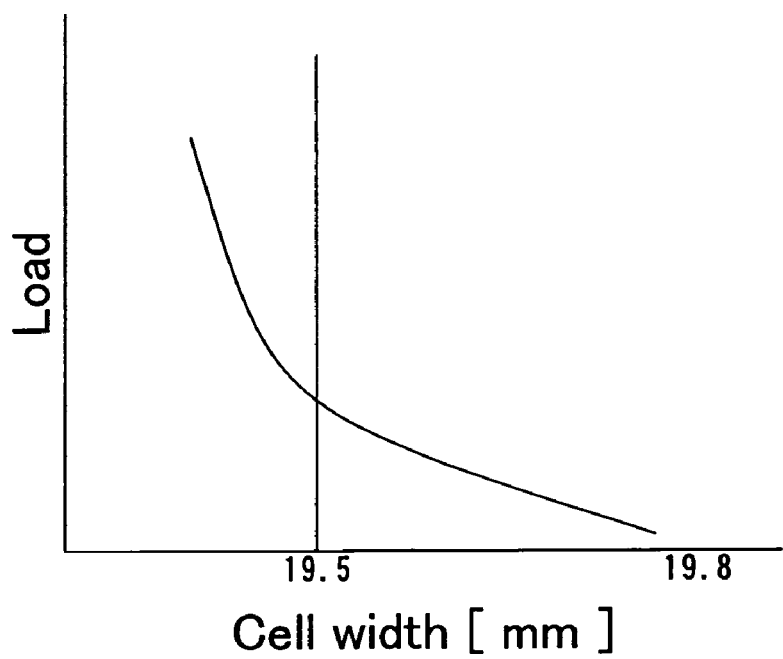

First, the influence of varying the number of unit cells 20 will be described. FIG. 5A schematically shows the case where one unit cell 20 is interposed between two end plates 11. Herein, it is assumed that a width S of the unit cell 20 before binding (distance between the highest portion of the ribs 25 formed on one side surface 22a and the highest portion of the ribs 25 formed on the other side surface 22a) is 19.8 mm. FIG. 5B shows a relationship between a load F applied to the unit cell 20 by the end plates 11 and the width S of the unit cell 20. Hereinafter, a curve representing the relationship between the load F and the width S may be referred to as an F-S curve. As shown in FIG. 5B, when the load F is varied, the width S is changed.

Figure 6A:
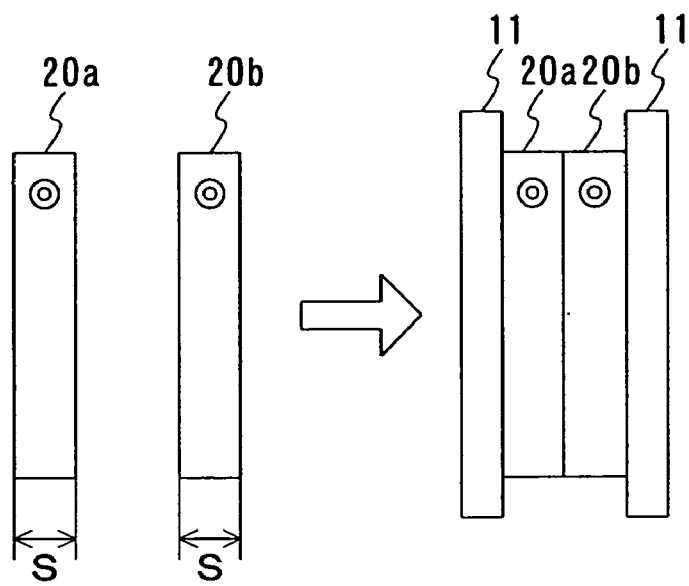
FIGS. 6A and 6B illustrate the relationship between the load and the cell width.
Figure 6B:
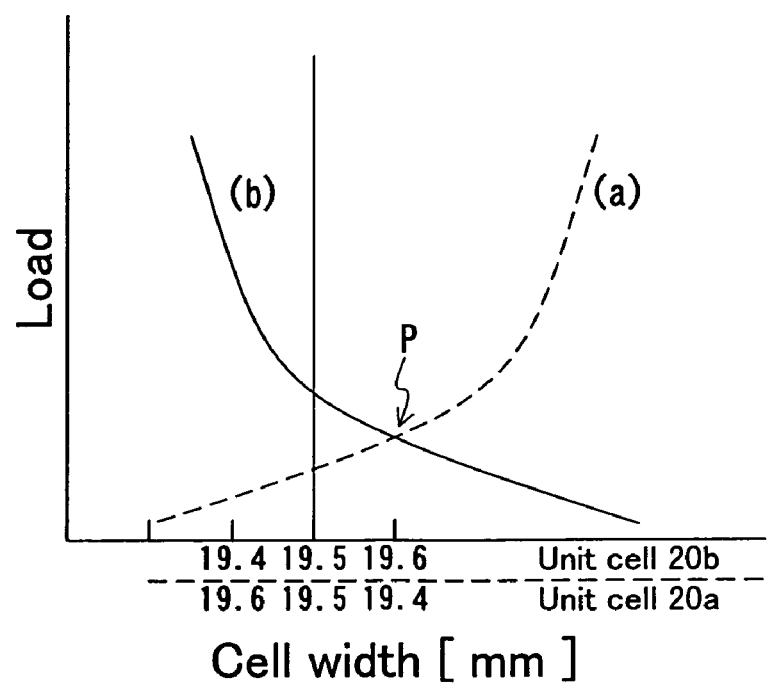

FIG. 6A schematically shows the case where a unit cell 20a and a unit cell 20b are interposed between two end plates 11. The unit cells 20a and 20b are similar to the unit cell 20. It is assumed that the width S of the unit cell 20a before binding is 19.65 mm, and that of the unit cell 20b before binding is 19.8 mm. In FIG. 6A, the unit cells 20a and 20b are bound to each other so that the distance between two end plates 11 becomes 39 mm. At this time, each width S of the bound unit cells 20a and 20b can be obtained by using the F-S curves of the unit cells 20a and 20b. The F-S curve of the unit cell 20a and the F-S curve of the unit cell 20b are represented by (a) and (b) in FIG. 6B. In FIG. 6B, the horizontal axes of the F-S curves are reversed between the unit cells 20a and 20b so that the total of the width S of the unit cell 20a and the width S of the unit cell 20b becomes 39 mm (19.5 mm×2). In FIG. 6B, a crossing point between the F-S curves of the unit cells 20a and 20b corresponds to a balance position P where the loads of both the unit cells are matched with each other. It is understood from FIG. 6B that after binding, the width S of the unit cell 20a becomes 19.4 mm, and the width S of the unit cell 20b becomes 19.6 mm. Herein, when the width S of the unit cell 20 exceeds the limit of a predetermined amount of irreversible deformation of the integrated battery container 22, the predetermined amount of irreversible deformation is caused in the integrated battery container 22. Therefore, by prescribing the balance position P so that the width S does not exceed the limit of a predetermined amount of irreversible deformation of the integrated battery container 22, the predetermined amount of irreversible deformation of the integrated battery container 22 can be prevented. The balance position P can be changed by varying a binding force. As described above, in the combined battery 10, each cell can be bound with a binding force equal to or lower than a threshold value at which a predetermined amount of irreversible deformation is not caused in the integrated battery container 22.

Figure 7A:
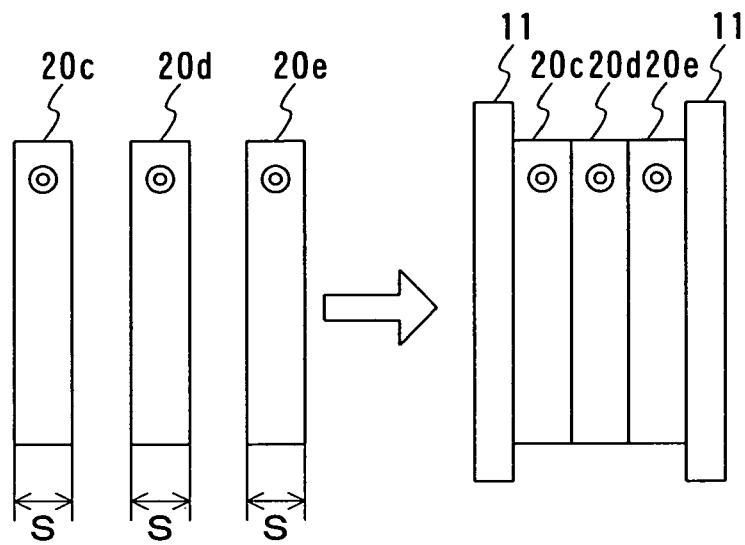
FIGS. 7A and 7B illustrate the relationship between the load and the cell width.
Figure 7B:
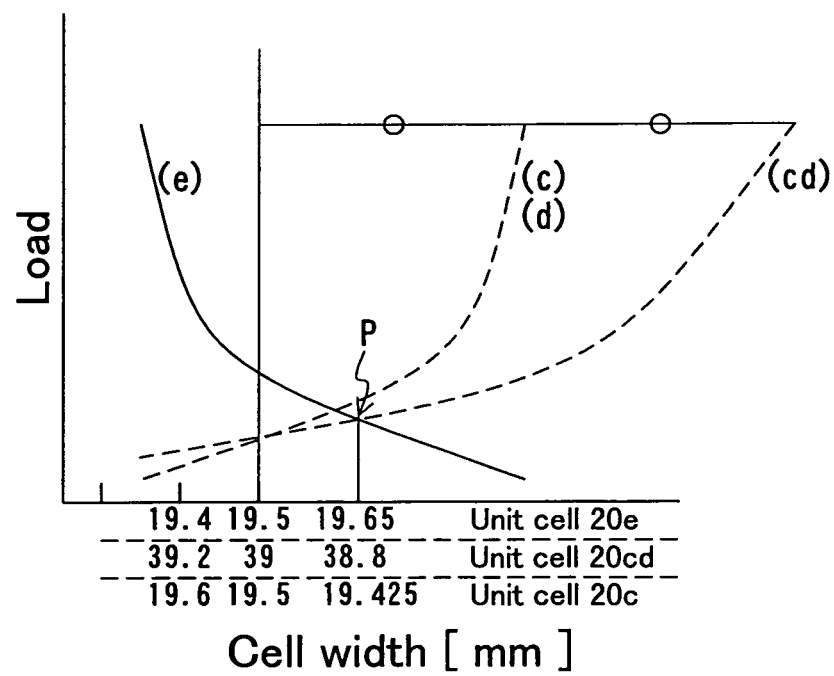

FIG. 7A schematically shows the case where unit cells 20c, 20d, and 20e are interposed between two end plates 11. The unit cells 20c to 20e are similar to the unit cell 20. Herein, it is assumed that the width S of the unit cells 20c and 20d before binding is 19.65 mm, and the width S of the unit cell 20e before binding is 19.8 mm. In FIG. 7A, the unit cells 20c to 20e are bound to each other so that the distance between two end plates 11 becomes 58.5 mm (19.5 mm×3). In this case, the unit cells 20c and 20d are compressed by the same amount. Therefore, the/F-S curve of a virtual unit cell 20cd (combination of the unit cells 20c and 20d) has a horizontal axis which is twice that of the F-S curve of the unit cell 20c. The F-S curves of the unit cell 20c, the virtual unit cell 20cd, and the unit cell 20e are represented by (c) and (d), (cd), and (e) in FIG. 7B. As is apparent from FIG. 7B, the width S of the unit cell 20e (which is larger than those of the other cells; hereinafter, which may be referred to as an "expanded cell") at the balance position P becomes larger, compared with the case where two unit cells 20 are bound. In this manner, by varying the number of cells to be bound, the expansion coefficient of the expanded cell at the balance position P can be changed. For example, by decreasing the number of cells to be bound, the width S of the expanded cell at the balance position P can be decreased. Thus, a predetermined amount of irreversible deformation can be prevented in the integrated battery cell 22.

Figure 8A:
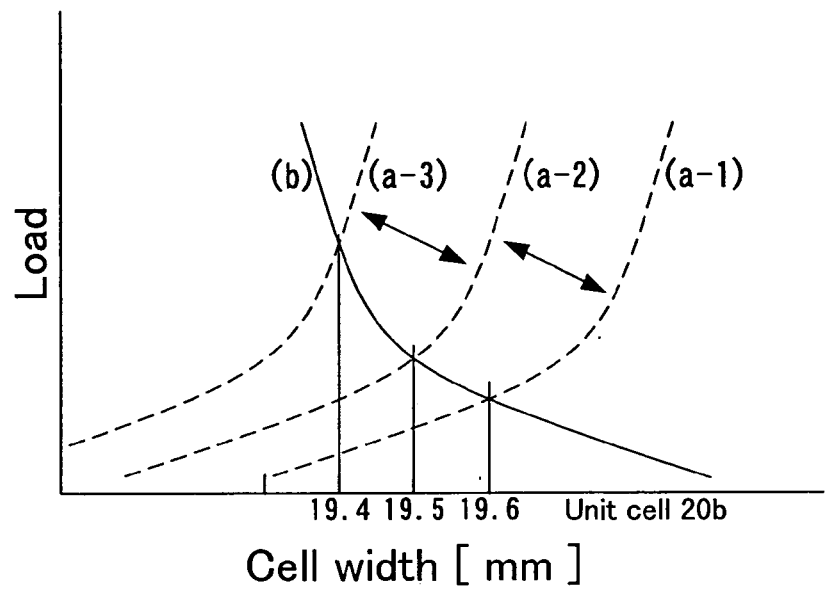
FIGS. 8A and 8B illustrate the relationship between the load and the cell width.
Figure 8B:
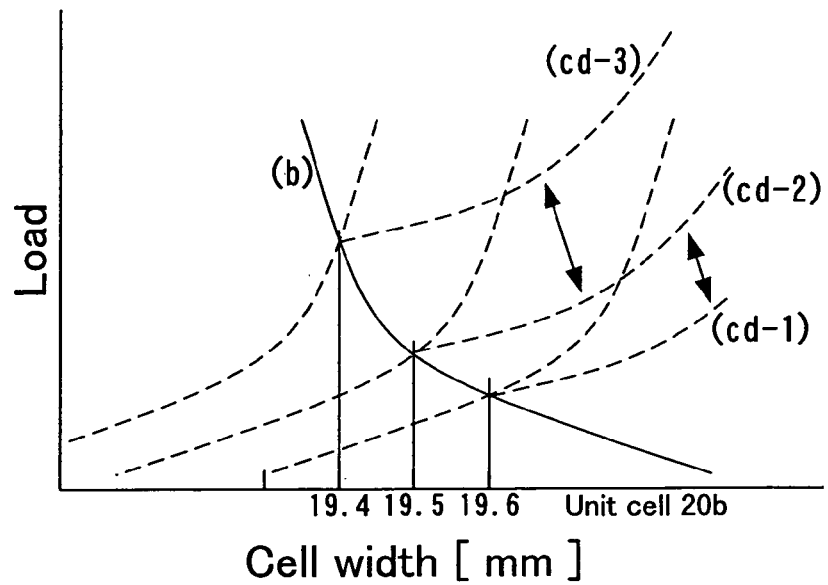

Next, the influence of varying the compressibility of a cell will be described. FIG. 8A shows the F-S curves of the unit cells 20a and 20b described with reference to FIG. 6. In FIG. 8A, (a-1) represents an initial F-S curve of the unit cell 20a, (a-2) represents an F-S curve in which the compressibility of a cell is increased, and (a-3) represents an F-S curve in which the compressibility of a cell is further increased. Furthermore, in FIG. 8A, (b) represents the F-S curve of the unit cell 20b. As shown in FIG. 8A, by varying the compressibility of a cell, the slope of the F-S curve can be changed. More specifically, by varying the compressibility of the unit cells 20 to be bound, the width S of the unit cell 20 at the balance position P can be changed. Similarly, even in the case where the number of unit cells 20 to be bound is 3 or more, the slope of the F-S curve can be changed by varying the compressibility of the unit cell 20. FIG. 8B shows F-S curves in the case where three unit cells are bound. In FIG. 8B, (cd-1) represents an initial F-S curve of the virtual unit cell 20cd described in FIGS. 7A and 7B. As the unit cell 20cd is compressed, the F-S curve changes to (cd-2) and (cd-3).

Figure 9:
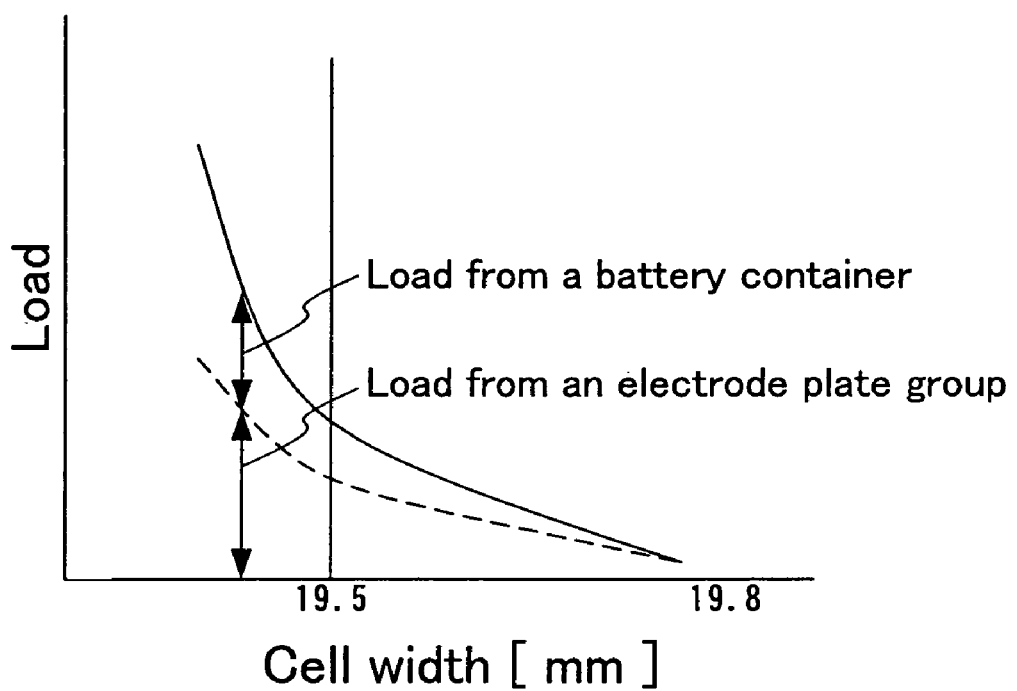
FIG. 9 illustrates the relationship between the load and the cell width.

Next, the influence of varying the stiffness of the integrated battery container 22 will be described. The load applied to the unit cell 20 is classified into a load from the electrode plate groups 33 and a load from the integrated battery container 22. FIG. 9 schematically shows a relationship between each load and the F-S curve. Herein, it is difficult to change F-S characteristics of the electrode plate groups, depending upon the design of a cell. However, the load from the integrated battery container 22 can be controlled. In order to vary the stiffness of the integrated battery container 22, the height of the partition walls 31 (height from the bottom surface of the battery container 32 to the lid 21), the thickness of the partition walls 31, the material of the integrated battery container 22 (Young's modulus of the integrated battery container 22), or the like can be changed. By varying the stiffness of the integrated battery container 22, the width S of the unit cell at the balance position P can be changed. For example, when the stiffness of the integrated battery container 22 is increased, the slope of the F-S curve is increased, and the width S of the expanded cell at the balance position P is decreased.

In the combined battery 10 of the present invention, the maximum binding force (threshold value A) is obtained that does not generate the predetermined amount of deformation in the integrated battery container 22, considering the above-mentioned factors, and the unit cells 20 are bound to each other with a binding force equal to or lower than the threshold value A. Thus, in the combined battery 10 of the present invention, the predetermined amount of irreversible deformation can be prevented in the integrated battery container 22.

According to another aspect, the present invention relates to a method for designing (or producing) a combined battery. More specifically, according to the method for designing a combined battery of the present invention, a binding force, the distance between two end plates, the number of unit cells, the compressibility of the unit cell, and the stiffness of the integrated battery container are varied so that the width S of the unit cell at the balance position P does not exceed the limit of a predetermined amount of irreversible deformation of the integrated battery container, based on the F-S curves of the unit cells to be bound.

In the above-mentioned embodiment, the case has been described where the cells to be bound are unit cells with a plurality of cells (provided with only one electrode plate group). However, cells may be bound.

As described above, according to the present invention, a combined battery is obtained that can prevent a predetermined amount of irreversible deformation in a battery container.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method of making a combined battery, the method comprising the steps of:
    providing a plurality of sealed cells, wherein each of the cells is provided with a battery container made of resin;
    stacking the plurality of sealed cells adjacent each other;
    providing two end plates for binding the stacked cells;
    determining a binding fore equal to or lower than a threshold value at which no more than a predetermined amount of irreversible deformation would be caused in the battery container, the threshold value based on a number and a compressibility of the plurality of cells and stiffness of the battery container; and
    binding the plurality of sealed cells by two end plates under the binding force,
    wherein the threshold value is based on a crossing point of the F-S curves of at least one or more expanded cell and remaining compressed cell, wherein the battery container is in a compressed state due to the binding force immediately after assembly of the combined battery, where F represents load applied to unit cell and S represents width of unit cell.

2. A method according to claim 1, wherein each cell includes an electrode plate group containing positive electrode plates and negative electrode plates stacked adjacent each other with separators interposed therebetween, the cells being stacked in a direction corresponding to a stacking direction of the electrode plate groups.

* * * * *

UNITED STATES PATENT AND TRADEMARK OFFICE
CERTIFICATE OF CORRECTION

PATENT NO. : 7,060,116 B2  Page 1 of 1
APPLICATION NO. : 11/104019
DATED : June 13, 2006
INVENTOR(S) : Marukawa et al.

It is certified that error appears in the above-identified patent and that said Letters Patent is hereby corrected as shown below:

Title page, Assignee Name Item (73): "Toyota Jidoshi Kabushiki Kaisha" should read --Toyota Jidosha Kabushiki Kaisha--

Signed and Sealed this

Second Day of December, 2008

JON W. DUDAS
*Director of the United States Patent and Trademark Office*